Feb. 3, 1942.  A. STRAUSS  2,271,520
AUTOMATIC TOASTER
Filed Dec. 13, 1939  3 Sheets-Sheet 1
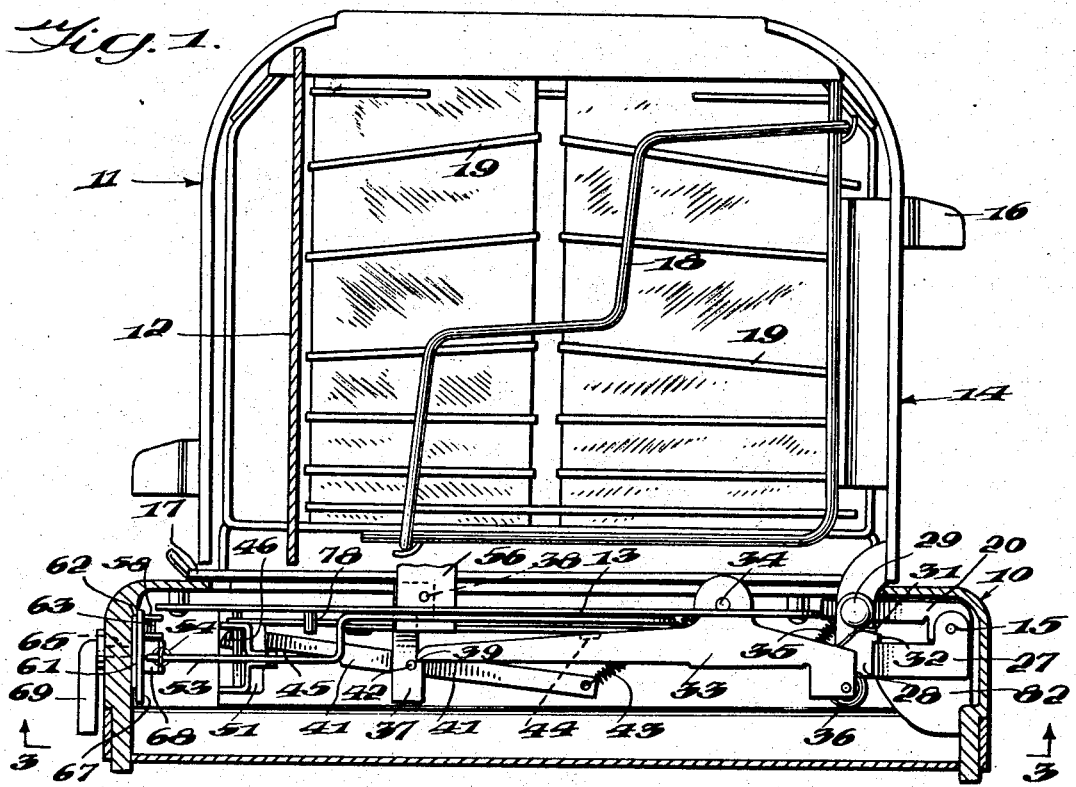
Inventor
ALFRED STRAUSS,
By H. M. Biebel
Attorney Feb. 3, 1942. A. STRAUSS 2,271,520
AUTOMATIC TOASTER
Filed Dec. 13, 1939 3 Sheets-Sheet 2
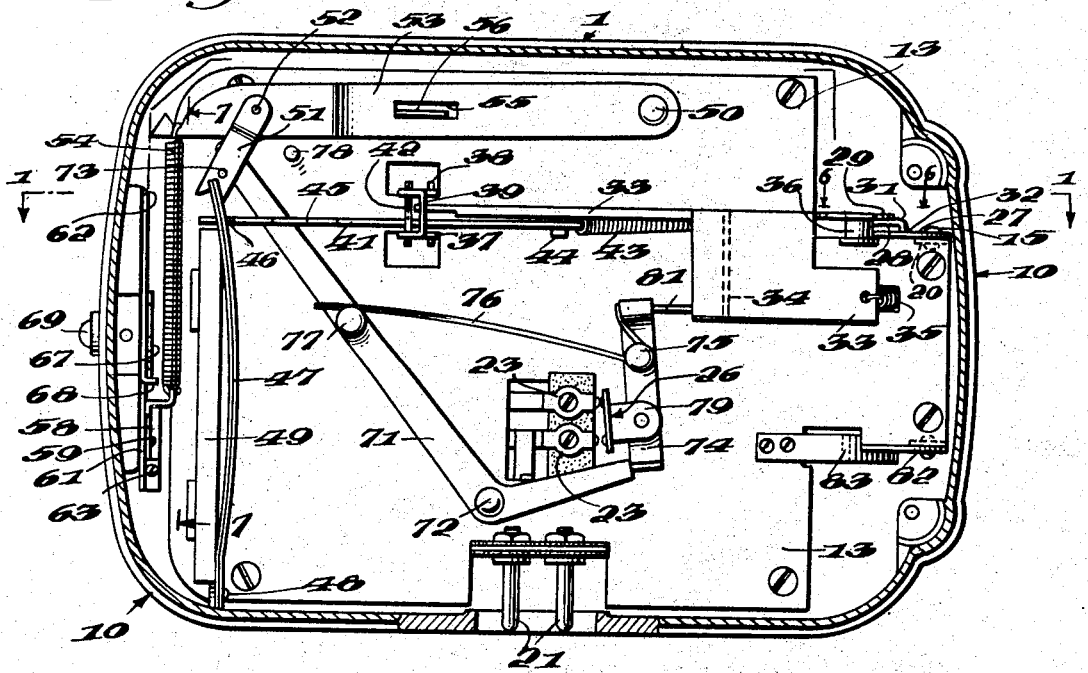
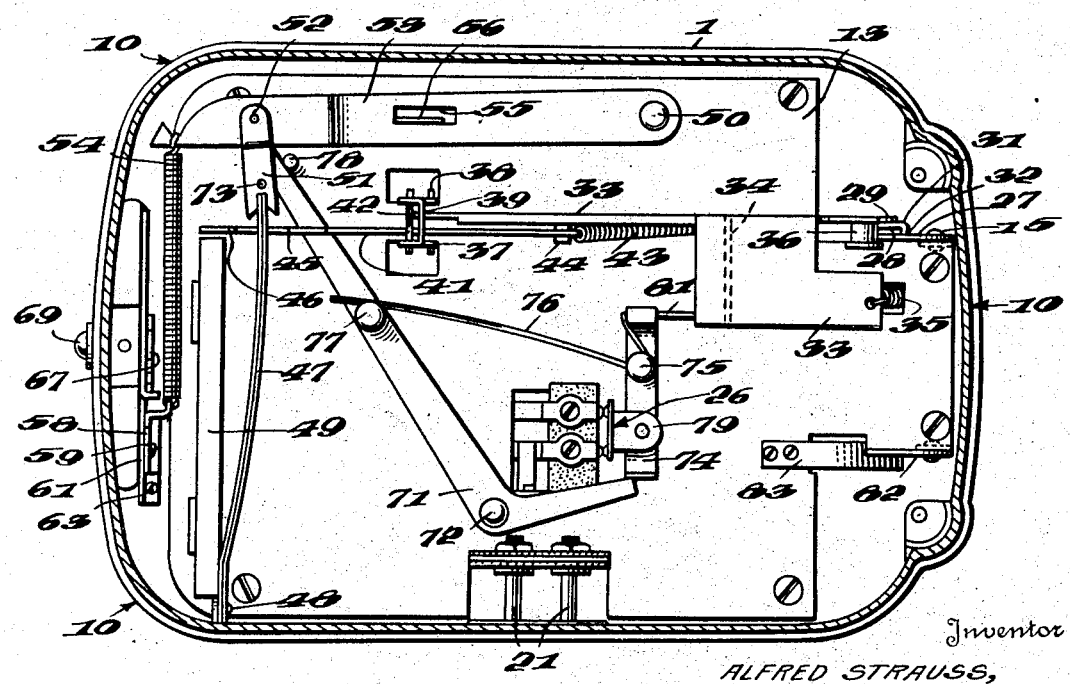
Inventor
ALFRED STRAUSS,
By H. M. Biebel
Attorney Feb. 3, 1942.　　　A. STRAUSS　　　2,271,520
AUTOMATIC TOASTER
Filed Dec. 13, 1939　　　3 Sheets-Sheet 3
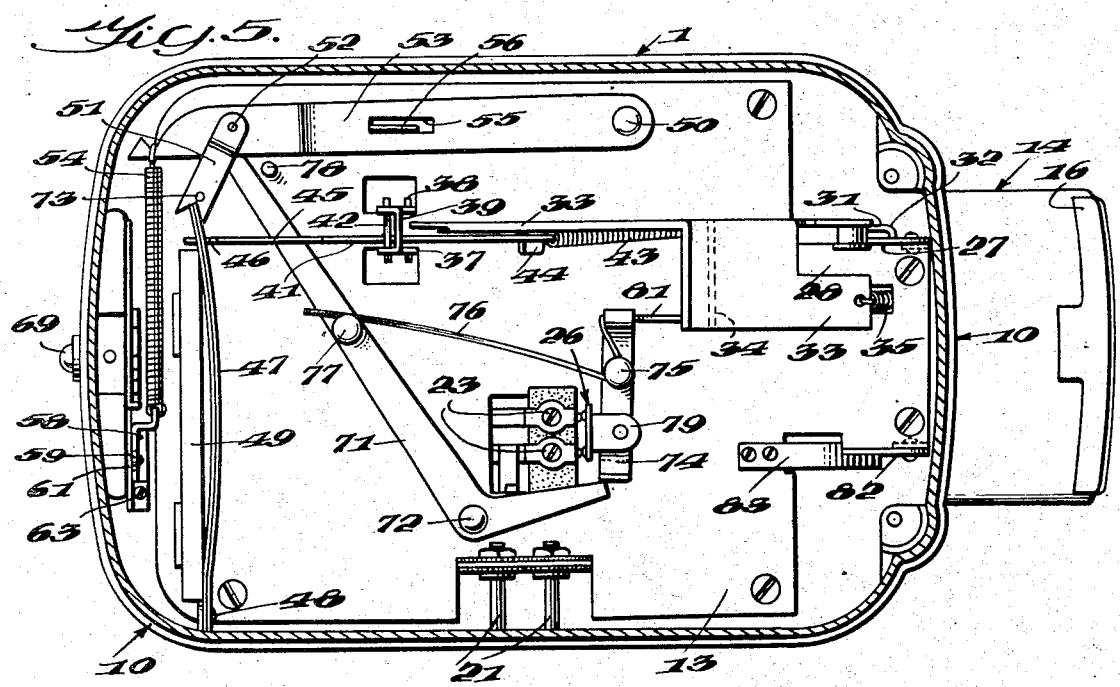
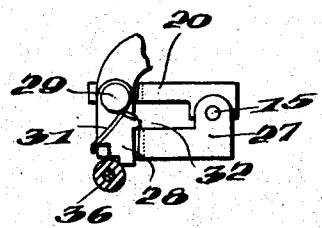
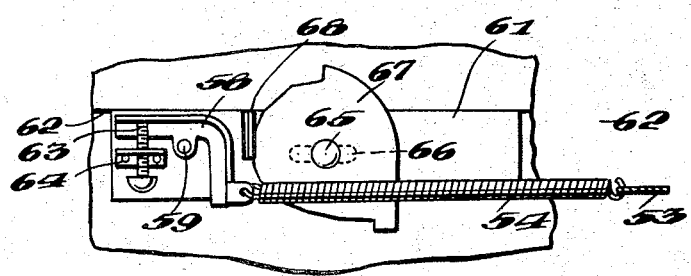
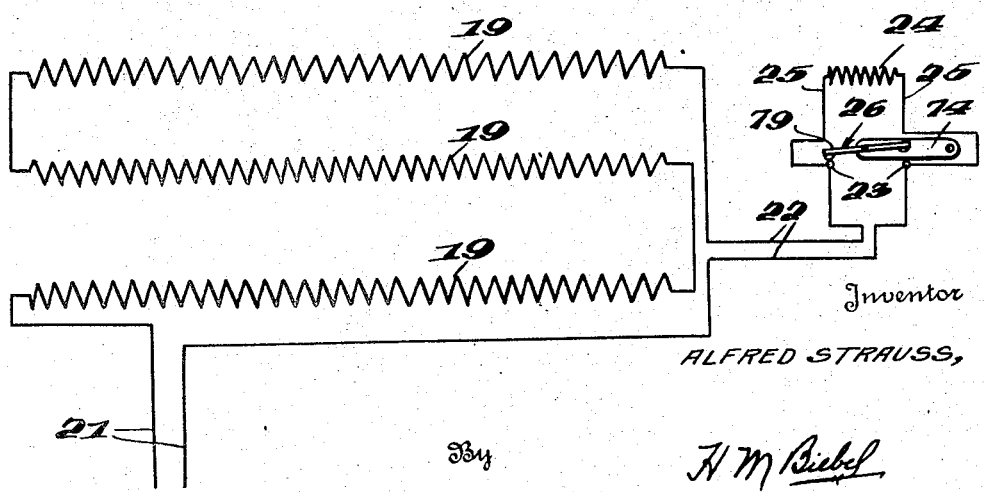
Inventor
ALFRED STRAUSS,
By H. M. Biebel
Attorney Patented Feb. 3, 1942

2,271,520

UNITED STATES PATENT OFFICE 2,271,520

AUTOMATIC TOASTER

Alfred Strauss, Chicago, Ill., assignor, by mesne assignments, to McGraw Electric Company, a corporation of Delaware Application December 13, 1939, Serial No. 309,084

5 Claims. (Cl. 219—19)

This invention relates in general to automatic toasters, and more specifically to novel mechanism operable in conjunction therewith for automatically timing a toasting operation and ejecting the toast from the heating zone at the termination of such an operation.

A principal object of the invention is the provision of novel timing mechanism in an automatic toaster which is extremely simplified in construction and positive and accurate in operation.

Another important object of the invention is the provision of means for automatically timing a cooking operation which employs an electrically heated thermostatic element which itself automatically terminates the heating thereof, and which, in the subsequent cooling thereof, causes the product being cooked to be ejected from the heating zone.

A further important object of the invention is the provision in such a timing mechanism of novel means for manually varying the initial tension in the thermostatic strip employed.

Another object of the invention is the provision of an auxiliary thermostatic element in such a timing mechanism which functions to automatically vary the initial tension on the main thermostatic strip in accordance with the temperature of the cooking apparatus.

Numerous other objects and advantages of the invention will be apparent from the following description, which, when taken in connection with the accompanying drawings, discloses a preferred embodiment thereof.

In the drawings,

Figure 1 is a longitudinal section of an automatic toaster embodying the features of the instant invention taken on the line 1—1 of Figure 3;

Figure 2 is a view similar to Figure 1 with the parts shown in their positions at the completion of a toasting operation;

Figure 3 is a horizontal sectional view taken substantially on the line 3—3 of Figure 1;

Figure 4 is a view similar to Figure 3 with the parts shown in an intermediate position during a toasting operation;

Figure 5 is a horizontal sectional view taken substantially on the line 5—5 of Figure 2;

Figures 6 and 7 are vertical detailed sectional views taken substantially on the lines 6—6 and 7—7, respectively, of Figure 3; and Figure 8 is a diagrammatic view or wiring diagram of the circuits employed in the instant device.

Referring more particularly to the drawings, reference numeral 11 indicates in general the housing of an automatic toaster which may be of any desired shape and construction, and preferably includes a three-sided shield or inner housing 12 disposed therein with its open side at the right of Fig. 1. The housing 11 is mounted upon a suitable hollow base of molded composition material, such as Bakelite, indicated by reference numeral 10, within which the timing mechanism to be later described is disposed. The various parts of the timing mechanism are mounted on a plate 13, which is secured inside the hollow base 10 by means of screws. The housing 11 is open at its top and right hand side (viewing Fig. 1), and a suitable closure member and bread carrier, indicated generally by reference numeral 14, is pivotally mounted on the plate 13 at 15, and is adapted to be manually swung to its closed position of Fig. 1 by means of a suitable handle 16. A crumb tray 17 is slidably disposed within the housing 11 below the bread carrier 14 on the upper portion of the base 10, and is adapted to be removed through a suitable aperture in the left side of the casing 11, viewing Fig. 1.

The bread carrier 14 is preferably provided with two slice holding elements 18 which are arranged in spaced parallel relationship to each other. A plurality of heating elements 19, shown herein as three in number, are disposed in the usual manner within the housing 11 interiorly of the inner shield 12 on either side of and between the slice holding elements 18. It will be readily apparent from Fig. 1, that the crumb tray 17 functions to aid in insulating the mechanism disposed therebelow, which will be later described, from the heating effect of the coils 19.

As shown in Fig. 8, the several heating elements 19, which may be of any suitable construction, are connected in series with an auxiliary heating element 24 and a pair of binding posts or terminal pins 21. The pins 21 are adapted to be connected in the usual manner to a suitable source of electrical current. Contact members 23 are connected by leads 25 with ends of auxiliary heating element 24. The contact members 23 and posts 21 are mounted upon the plate 13 and are electrically insulated therefrom in any suitable manner. A movable contact or switch member, indicated generally by reference numeral 26, is mounted upon the plate 13 in a manner to be later described, and is adapted when in closed position of Figs. 4 and 5 to contact the two stationary members 23 to shunt out the auxiliary resistance 24.

That portion of the bread carrier 14 which supports the same and is pivoted to vertical wing extensions 20 of the plate 13 at 15 constitutes a bracket member 27 of substantially L-shape. Referring more specifically to Figs. 1, 2 and 6, a substantially vertically disposed pawl 28 of bar shape, is pivotally mounted adjacent its upper end at 29 upon the bracket 27 and is urged in a clockwise direction by a suitable spring 31. On its right hand edge, viewing Fig. 6, the pawl 28 is provided with a lateral extension 32 which is adapted to contact a vertical edge of the bracket 27 to limit pivotal movement of the pawl in a clockwise direction.

An actuating member 33 is pivotally mounted at 34 on the plate 13. A spring 35 is connected at one end to the plate 13 and at its other end to actuating member 33 adjacent the right hand end thereof, viewing Figs. 1 and 3, which tends to urge the right hand end of the actuating member 33 upwardly. This right hand end of the actuating member 33 is provided with a roller 36 which is positioned in the path of movement of the lower end of the pawl 28 as the latter is swung with the bread holder 14 in its movements between operative and inoperative positions. When the bread holder 14 has been swung in a counter-clockwise direction to almost its closed or operative position, the lower end of the pawl 28 abuts against the roller 36 to move the actuating member 33 in clockwise direction, viewing Fig. 1, against the action of the spring 35. Further swinging movement of the bread holder 14 to a small extent forces turning movement in a counter-clockwise direction of the pawl 28 because of the extension 32 thereon engaging an edge of the bracket 27, so that the lower left-hand edge of pawl 28 is on the right of and in contact with the roller 36.

A yoke or latch member 37, which is substantially U-shaped, is pivotally mounted at its upper end at 38 on the plate 13, and is provided with a substantially horizontally disposed shelf or cross portion 39 which is adapted to engage beneath the left hand end of the actuation member 33, as shown in the drawings, to maintain the latter in its operative position of Figs. 1, 3 and 4. A link or trip member 41 is pivotally connected intermediate its ends by means of a pin 42 to the yoke or latch member 37. The right hand end of the trip member 41, viewing Fig. 1, is connected to one end of a coil spring 43 which in turn is connected at its other end in any suitable manner to the plate 13. The spring 43 urges the yoke or latch member 37 to the right or in a counterclockwise direction to maintain the same in latching position of Fig. 1. A lateral projection 44 is provided on the upper side of the actuating member 33 at the left-hand side of its pivot 34, which projection is adapted to contact the upper edge of the trip member 41 between its pivot point 42 and the point of connection of the spring 43 therewith when the actuating member 33 is turned in a counterclockwise direction by its spring 35. In such downward movement of the actuation member 33, the projection 44 turns the trip member 41 a short distance in a clockwise direction.

The other or left hand end of the trip member 41 is provided with a cutaway portion or recess 45 in its lower surface to provide a nose or shoulder portion 46 adjacent the end thereof. This left hand end of the trip member 41 extends through a suitable aperture in a bi-metallic strip or thermostatic element 47 which is rigidly connected at its opposite end at 48 to one end of a casing or housing 49 which is in turn mounted in any suitable manner upon the plate 13. The casing 49 is open on the side next to the thermostatic element 47 and houses the auxiliary heating element or resistance 24 above referred to.

The free end of the thermostatic element or bi-metallic strip 47, which is that end adjacent the trip member 41, is engaged by the bifurcated end of a link 51 (Figs. 3, 4 and 5). The other end of the link 51 is pivotally connected at 52 to a lever 53 adjacent the free end thereof. The opposite end of the lever 53 is pivotally mounted upon the plate 13 at 50. Intermediate its ends, the lever 53 is provided with an aperture 55 through which the lower end of secondary bi-metallic or thermostatic strip 56 extends. The upper end of the secondary thermostatic element 56 is rigidly connected at 57 (Fig. 2) to the inner casing 12 disposed within the outer housing 11 of the toaster. The free end of the lever 53 is connected to one end of a coil spring 54, the other end of which is connected to one end of a bell crank 58 (Fig. 7).

The bell crank 58 is pivotally mounted at 59 intermediate its ends upon a laterally movable slide 61, the upper surface of which engages the lower surface of a shelf portion 62 (Figs. 1, 3 and 7) formed on the left end wall of the molded base 10. The other end of the bell crank 58 is engaged by the upper end of a screw 63 extending through a suitable tapped bracket 64 mounted upon the slide 61. The screw 63 is adapted to adjust the bell crank 58 to initially tension the spring 54 to the degree desired.

A stud shaft 65 is mounted for rotation in one end wall of the base 10 (Fig. 1) and extends through a suitable slot 66 in the slide member 61, as shown in broken lines in Fig. 7, to guide the longitudinal movements of slide 61. A cam member 67 is rigidly secured to the inner end of the shaft 65 and is adapted to engage a lug or offset portion 68 on the slide member 61. The outer end of the shaft 65 is provided with a suitable handle 69. Rotation of the handle 69 moves the cam member 67 to adjustably position the slide 61, so that the desired tension may be manually set in the spring 54 for a purpose to be later described.

A bell crank 71, comprising part of an auxiliary latching mechanism, is pivotally mounted intermediate its ends at 72 to the plate 13. The longer of the arms of the bell crank 71 engages a pin 73 or other suitable means mounted on the link 51. The other end of the bell crank 71 is adapted to cooperate as a latch with one end of a lever 74 forming a part of the switch 26 above referred to. The lever 74 is pivotally connected intermediate its ends on a stud 75 which is mounted upon the plate 13. The other end of the lever 74 is engaged by one end of a spring 76 which is mounted upon the stud 75 and the other end of which engages a suitable stud 77 mounted upon the longer arm of the bell crank 71. The spring 76 thus urges the bell crank 71 in a counterclockwise direction, viewing Fig. 3, and the lever 74 in a clockwise direction about their respective pivot points 72 and 75. A contact member 79 is pivotally connected to the lever 74 intermediate its pivot point 75 and the end thereof which cooperates with the bell crank or latch member 71. A lever or arm 81 is connected to the actuating member 33 (Figs. 3, 4 and 5) which is adapted to contact the other end of the lever 74 to swing the latter in a counterclockwise direction when the actuating member 33 is swung in a clockwise direction (viewing Fig. 1) as it is moved to operative position. Such movement of the lever 74 results in the swinging of the free end thereof out of the path of movement of the end of the bell crank or latch 71 from its positions of Figs. 4 and 5 to its position of Fig. 3. This movement of the lever 74 permits the spring 76 to move the bell crank 71 into its latching position of Fig. 3 wherein it retains the switch member 26 in open position, as shown in Fig. 3.

The bread carrier or slice holder 14 is provided with a downwardly extending arm 82 which is adapted to cooperate with a curved leaf spring 83, connected at one end in any suitable manner to the plate 13, when the bread holder 14 is moved to the inoperative position (as shown in Fig. 2) to cushion such movement.

The operation of the above described device is as follows:

When it is desired to perform a toasting operation, the bread to be toasted is inserted in the slice holder 14 and the latter is moved from its inoperative position of Fig. 2 to its operative position of Fig. 1. In such movement of the slice holder 14, the pawl 28 impinges against the roller 36 and moves the actuating member 33 from its inoperative position of Fig. 2 to a point slightly beyond its operative position of Fig. 1, whereupon the end of pawl 28 slips off the roller 36 and member 33 is released. In such movement of the actuating member 33, the yoke or latch member 37 is first swung thereby in a clockwise direction and is then returned by the spring 43 to engage beneath the free end of the actuating member 33 when the latter is released by pawl 28. At the same time, the lever 81 on the actuating member 33 moves the switch member 26 from its closed position of Figs. 4 and 5 to its open position of Fig. 3 where it is maintained by the latch member 71, as above described. As soon as the binding posts 21 have been connected in the usual manner to a source of electrical energy, the heating elements 19 are energized. Since the switch 26 has been moved to open position, as above explained, the heating element 24 is also energized, the latter being connected in series with the heating elements 19, as shown in Fig. 8.

The auxiliary heating element or resistance 24 heats the thermostatic element or bi-metallic strip 47 to cause the latter to be deformed and moved from its normal position of Fig. 3 to its expanded or flexed position of Fig. 4. This movement of the thermostatic element 47 rotates the member 51 on its pivot 52 and is opposed by the resistance of the spring 54 as applied to the strip by means of the members 53 and 51, until the member 51 passes dead center, whereupon the strip suddenly moves to the position shown in Fig. 4. This expanding movement of the thermostatic element 47 moves the bell crank or latch 71 from its latching position of Fig. 3 toward its inoperative position of Fig. 4, and near the end of the movement of the thermostatic element 47, the latch 71 frees the lever 74 and permits the contact member 79 to bridge the stationary contacts 23. Such movement of the switch member 26 to closed position is accomplished by the spring 76, and is not interfered with by the member 81, since the latter has been moved past the lever 74 in the above described movement of the actuating member 33 to operative position.

Closing of the switch member 26 shunts out the auxiliary resistance or heating element to deenergize the same and permit the thermostatic element or bi-metallic strip 47 to cool and return to its normal position of Figs. 5 and 3. As the element 47 returns toward its position of Fig. 5, its movement is opposed by spring 54 as before, and the movement is delayed until the element has cooled sufficiently to rotate member 51 past dead center, whereupon the return to normal position is suddenly completed. Near the end of its return movement element 47 engages the shoulder or nose 46 of the trip lever 41 to pull the latter to the left against the tension of the spring 43. This movement of the trip lever 41 swings the yoke or latch member 37 in a clockwise direction (viewing Figs. 1 and 2) to release the actuating member 33. When thus released, the actuating member 33 is swung in a clockwise direction by the spring 35 and the roller 36 abuts against the bracket member 27 to move or kick the slice holder 14 from its operative position of Fig. 1 to its inoperative position of Fig. 2. Such movement of the slice holder 14 is cushioned by the spring 83, as above described. The downward movement of the previously latched end of the actuating member 33 results in the lip 44 thereon impinging against the lever 41 to disengage the free end of the latter from the lower surface of the associated aperture in the bi-metallic element 47. The parts thus assume their several normal positions, so that they may again be readily returned to operative position merely by the movement of the slice holder from inoperative to operative position.

From the above description it will be seen that the duration of the timing operation is determined by a heating and a subsequent cooling of the thermostatic element 47. This predetermined period of time may be varied manually by actuation of the control handle 69 to move the cam 67 to vary the initial tension in the spring 54. The tension maintained in the spring 54 is directly transmitted to the thermostatic element 47 by the members 53 and 51. That is, the movement of element 47 on heating or cooling rotates member 51 on its pivot, thereby rotating lever 53 on its pivot against the tension of spring 54. The screw 63 is employed for the purpose of setting a desired initial tension in the spring 54 when the device is originally tested in the factory. The tension may also be varied as stated above by means of the adjusting handle 69, and thus the toasting period may be varied manually by the user to produce light or dark toast, as desired.

In addition to the above described manual variations or alterations of the toasting period, it has been found desirable to provide automatic means for varying this period in accordance with the temperature of the toasting device. This is necessary for the obvious reason that over a period of continued use, the toasting apparatus assumes a higher initial temperature than is the case when it is first put into operation. This difference in the temperature of the apparatus, and its resulting effect upon the cooking operation, is automatically compensated for by the auxiliary thermostatic element or bi-metallic strip 56. The element 56 is tensioned so as to tend to rotate lever 53 in the same direction as spring 54, and its effect is thus added to that of the spring. As the temperature of the toasting apparatus increases, the auxiliary thermostatic element 56 heats up also, and its lower end presses with gradually decreasing force on lever 53, the pressure being substantially entirely relieved by the time the toasting apparatus reaches its maximum temperature. In this manner, an increase in temperature of the toasting apparatus automatically results in a speeding up of the toasting operation, with the result that the toast is always turned out in the desired condition.

It is thought that the invention and its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a bread toaster, a toasting compartment, a toggle device of which one arm is a bi-metallic strip and the other arm is a pivoted member, a lever on which said member is pivoted, an adjustable spring acting on said lever in the proper direction to collapse said toggle device, means for operating said device by heating and cooling said strip, means for terminating a toasting operation by operation of said device responsive to cooling of said strip, and a second bi-metallic strip receiving heat from said compartment, said last mentioned strip interfitting with and initially pressing said lever in the same direction as said spring and being adapted to apply a decreasing force to the lever as the temperature of the toasting compartment increases.

2. An automatic electric toaster comprising toast heating elements, a bread carrier normally yieldingly biased out of direct heat receiving relation to the toast heating elements and movable into direct heat receiving relation relatively thereto, a pivoted latch for holding the bread carrier in said direct heat receiving position, a trip bar connected with said latch and having a recess in one edge and a thermal timing means for causing release movement of said latch to terminate a toasting operation, said timing means including a bimetal bar fixed at one end, a toggle arm engaging the free end of the bimetal bar, a lever arm pivotally supporting the toggle arm, manually adjustable spring means to bias the lever arm to effect initial longitudinal compression of the bimetal bar and cause it to move with a snap action, means to heat and then to cool the bimetal bar to cause it to move in one direction and then in the return direction, spring means to press said one edge of the trip bar against the bimetal bar, said bimetal bar moving into the recess in the trip bar during heating thereof and causing movement of the trip bar and release of the latch on cooling whereby termination of a toasting operation is effected.

3. A device as set forth in claim 2 and including a second bimetal bar subject to toaster temperature having interfitting engagement with said lever arm and effective to cause a decrease in the compression of the bimetal bar with increase in toaster temperature to ensure substantially uniform toasting of successive slices of bread with varying toaster temperature.

4. An automatic electric toaster comprising a toasting chamber containing heating elements, a bread carrier movable into toasting and non-toasting position relative to the heating elements and biased to non-toasting position, thermal timing means for terminating a toasting operation comprising a bi-metallic strip fixed at one end, a pivotally mounted lever arm, a toggle arm pivotally mounted on said lever arm and having a free end engaging the free end of the bi-metallic strip, spring means acting on the pivoted lever arm to bias the toggle arm and the bi-metallic strip so as to cause the bi-metallic strip to move with a snap action, means to heat and then to cool the bi-metallic strip to cause it to move in one direction and then in the return direction, and means for holding the bread carrier in toasting position releasable in response to the snap movement of the bi-metallic strip upon cooling.

5. An automatic electric toaster as set forth in claim 4 including a second bi-metallic strip subject to toaster temperature engageable with the pivoted lever arm and effective to cause a decrease in the bias on the toggle arm and bi-metallic strip with increase in toaster temperature to insure uniform toasting of successive slices of bread with varying toaster temperature.

ALFRED STRAUSS.